United States Patent Office
3,370,055
Patented Feb. 20, 1968

3,370,055
THIAZOLYLAZOPHENYL DYES CONTAINING DICARBOXIMIDO RADICALS
Max A. Weaver and David J. Wallace, Kingsport, Tenn., assignors to Eastman Kodak Company, Rochester, N.Y., a corporation of New Jersey
No Drawing. Filed Sept. 3, 1964, Ser. No. 394,304
9 Claims. (Cl. 260—158)

ABSTRACT OF THE DISCLOSURE

Thiazolylazophenyl compounds useful as dyes for hydrophobic textile materials are characterized by the presence of a heterocyclic group attached to the coupler moiety of the compounds and having the formula

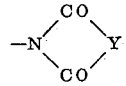

wherein Y represents —NH—NH— or a chain of 2 to 3 atoms consisting of carbon and at least one oxygen, sulfur, or nitrogen atom.

---

This invention relates to azo compounds particularly useful as dyes for textile fibers, yarns and fabrics.

The azo compounds have the following general formula

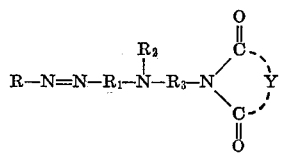

wherein

R = a monocyclic 2-thiazolyl radical, that is, a radical having the general formula

in which V is a vinylene radical, including unsubstituted vinylene, mono- and di-substituted vinylene groups, such as

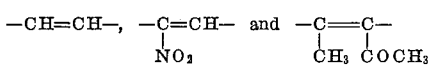

as present in 2-aminothiazole and the substituted 2-aminothiazoles described in the examples and table below. The alkyl, trihaloalkyl, lower carboalkoxy, e.g.,

lower alkylsulfonyl, nitro and thiocyano substituted 2-aminothiazoles are particularly efficacious for use in preparing the azo compounds, $R_1$ represents a phenylene radical including unsubstituted p-phenylene and substituted p-phenylene such as lower alkylphenylene, e.g. m-tolylene

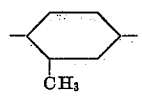

o-tolylene; lower alkoxyphenylene, e.g. 3-methoxyphenylene

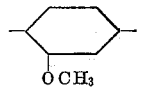

2,5-dimethoxyphenylene; lower carboxylic acid amidoplenylene, e.g. 3-acetamidophenylene; halophenylene, e.g. 3-chlorophenylene, $R_2$ represents hydrogen or an alkyl radical including lower alkyl and substituted lower alkyl such as hydroxyalkyl, e.g. hydroxyethyl; lower alkoxyalkyl, e.g. methoxyethyl; cyanoalkyl, e.g. cyanoethyl; lower alkanoyloxyalkyl, e.g. acetoxyethyl; lower carboalkoxyalkyl, e.g. carbethoxyethyl; halogenoalkyl, e.g. chloroethyl; lower alkylsulfonylalkyl, e.g. methyl sulfonylethyl; carboxamidoalkyl, e.g. carboxamidoethyl, etc. or $R_2$ represents a benzene radical such as unsubstituted phenyl and substituted phenyl such as the lower alkylphenyl, lower alkoxyphenyl, halophenyl and other substituted phenyl groups such as the monovalent analogs of the phenylene group given above, $R_3$ represents a lower alkylene group such as lower alkylene and lower alkylene substituted with hydroxy or chlorine and Y represents NH—NH— or a chain of 2 to 3 atoms consisting of carbon and at least one oxygen, sulfur, or nitrogen atom, for example, as in the radicals: 3,5-morpholinedione, 2,5-piperazinedione, uracil, 5,6-dihydrouracil, hydantoin, lower alkylhydantoin and 2,4-thiazolidinedione of the azo compounds described below.

The Straley et al. U.S. Patent 3,148,180 granted Sept. 8, 1964 claims azo compounds containing the dicarboximido radical

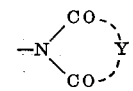

However, specific embodiments of that patent are limited to azo compounds wherein Y represents a chain containing only carbon atoms as in the succinimido radical. As described above, in the present azo compounds Y represents a chain of atoms containing at least one atom other than carbon including oxygen, nitrogen and sulfur. This distinctive structure imparts unexpected properties to the present azo compounds including improved fastness to light and sublimation especially when the azo compounds are used for dyeing textile materials. These substituents attached to the thiazolyl, phenylene and alkyl radicals R, $R_1$ and $R_2$ are not critical and serve primarily as auxochromes to control the color of the azo compound.

Herein, "lower alkyl group," "lower alkylene group" and the like, means that the group contains a chain of from 1 to 4 carbon atoms, straight or branch chained.

The azo compounds of the invention are prepared by coupling well-known 2-aminothiazoles, $RNH_2$, with the N-dicarboximidoalkylaniline coupling components of the invention having the formula (II) 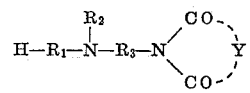

wherein R, $R_1$, $R_2$, $R_3$ and Y have the meaning given above.

The coupling components having the above Formula II are prepared by one of the two following methods:

(1)

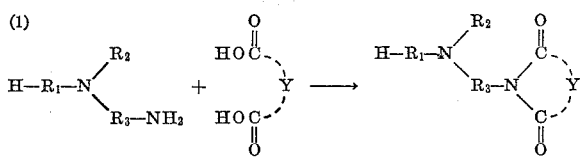

or anhydride (2)

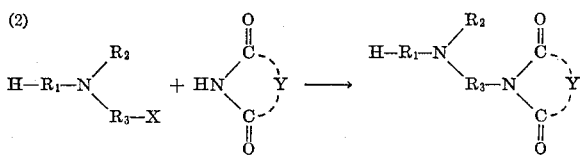

in which X is halogen.

The compounds wherein Y contains the —C—N— chain are illustrated by the uracil, dihydrouracil, hydantoin and piperazinedione substituted compounds of the examples. Where Y contains the —C—O— chain the morpholinedione substituted compounds of the examples are illustrative, and where Y contains the —C—S— chain the thiazolidinedione substituted compounds of the examples are illustrative.

The azo compounds can be used for dyeing textile materials including synthetic polymer fibers, yarns and fabrics giving a variety of fast shades including blue, yellow, red and brown when applied thereto by conventional dyeing methods. The azo compounds have moderate affinity for cellulose ester and polyamide fibers and possess the valuable property of staining wool less than do previous thiazole dyes. When the azo compounds are used for dyeing such hydrophobic materials, they should be free of water-solubilizing groups such as sulfo and carboxyl. In general the dyes have good fastness, for example, to light, washing, gas (atmospheric fumes) and sublimation.

The following examples will serve to illustrate the preparation of representative intermediates and azo compounds of our invention.

EXAMPLES OF N-DICARBOXIMIDO-ALKYLANILINE COUPLERS

*Preparation of 3 - [2 - N - ethyl - m - toluidino)ethyl] hydantoin.*—19. 7 g. N-2-cholorethyl-N-ethyl-m-toluidine, 10.0 g. hydantoin, 13.8 g. potassium carbonate, and 150 ml. dry dimethylformamide were refluxed together for one hour. The reaction mixture was drowned into 500 ml. of water giving a white solid on standing. The product was recrystallized from ethanol to give 13.5 g. of material melting at 76–77° C., having the structure:

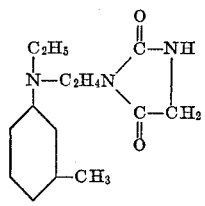

*Preparation of 3 - [2 - (N - ethyl - m - toluidino)ethyl]-5,5 - dimethylhydantoin.*—19.7 g. N - 2 - chloroethyl-N-ethyl-m-toluidine, 12.8 g. 5,5-dimethylhydantoin, 13.8 g. potassium carbonate, and 150 ml. dry dimethylformamide were refluxed together for one hour. Drowning into water, filtering, and recrystallizing from 75 ml. ethanol gave 15.2 g. white solid product with M.P. 81–82° C.

*Preparation of 3 - [2 - (N - ethyl - m - toluidino)ethyl]-1 - methylhydantoin.*—19.7 g. N - 2 - chloroethyl-N-ethyl-m-toluidine, 11.4 g. 1-methylhydantoin, 13.8 g. potassium carbonate, and 100 ml. dry dimethylformamide were refluxed together wor one hour. Drowning in water resulted in a white solid which was collected by filtration, washed with water, and recrystallized from 100 ml. ethanol to yield 18.5 g. product with M.P. 72–73° C.

*Preparation of 4 - [2 - (N - ethyl - m - toluidino)ethyl]-3,5 - morpholinedione.*—89.0 g. N - 2 - aminoethyl - N-ethyl-m-toluidine, 67.0 g. diglycolic acid, and 0.1 g. sulfanilic acid were heated together at 150–155° C. for one hour. The reaction mixture was poured into 500 ml. ethanol and the product allowed to crystallize. After collection by filtration and recrystallization from 500 ml. ethanol there was obtained 70.5 g. of product of M.P. 82–83° C. This material has the following structure:

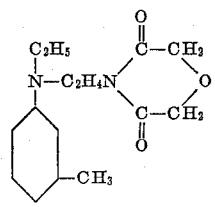

*Preparation of 1 - [2 - (N - ethyl - m - toluidino) ethyl]-2,5-piperazinedione.*—44.5 g. N - 2 - aminoethyl-N-ethyl-m-toluidine, 33.2 g. iminodiacetic acid, 0.1 g. sulfanilic acid were heated together at 180–190° C. for one hour. The reaction mixture was then poured into 300 ml. ethanol and the product allowed to crystallize. Collection by filtration gave 20.0 g. product when air dried. M.P. 191–194° C. One recrystallization from ethanol gave material melting at 197.5–198.5° C. The product had the following structure:

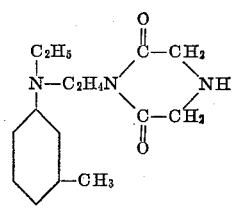

*Preparation of 3 - [2 - (N - ethyl - m - toluidino) ethyl] - 5,6 - dihydrouracil.*—N - 2 - chloroethyl - N-ethyl-m-toluidine, 11.4 g. 5,6-dihydrouracil, 13.8 g. potassium carbonate, and 100 ml. dry dimethylformamide were refluxed together for one hour. The reaction mixture was drowned into water, and the product collected by filtration, washed with water, and recrystallized from 50% aqueous ethanol. Yield—20.5 g., M.P. 108–110° C. The product has the following structure:

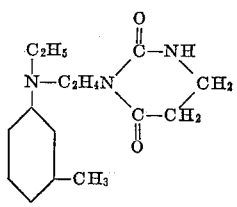

*Preparation of 3 - [2 - (N - ethyl - m- toluidino) ethyl] - 2,4 - thiazolidinedione.*—19.7 g. N - 2 - chloroethyl - N - ethyl - m - toluidine, 11.7 g. 2,4 - thiazolidinedione, 13.8 g. potassium carbonate, and 100 ml. dry dimethylformamide were heated together at 130° C. for one hour. Drowning of the reaction mixture into water gave a yellow oil, which was washed by decantation and taken up in 100 ml. ethanol. The product crystallized when alcohol solution was chilled. There was obtained 10.0 g. of product after filtering and drying in air. M.P. 59–60° C.

All of the couplers used were prepared by one of the above methods.

EXAMPLES OF THE DYES

Example 1

(A) *Diazotization.*—2.9 g. (0.02 m.) 2-amino-5-nitrothiazole was stirred in 60 cc. water and 32 cc. conc. $H_2SO_4$ was added. Immediate solution resulted. The solution was cooled to —10° C. and a solution of 1.4 g. $NaNO_2$ in 16 cc. conc. $H_2SO_4$ was added at —5° C. Stirring at —5° C. was continued for ten minutes.

(B) *Coupling.*—5.22 g. (0.02 m.) 3 - [2 - (N-ethyl-m-toluidino)ethyl]hydantoin was dissolved in 100 ml. 15% aqueous sulfuric acid. The coupling solution was cooled in an ice bath and the diazonium solution from (A) was added. After coupling ten minutes, the mixture was drowned in water, filtered, washed with water, and dried. The product dyes cellulose acetate and polyester fibers a brilliant violet shade.

The dye has the following structure:

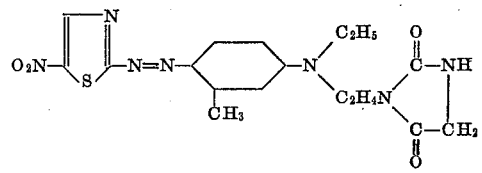

The azo compounds of the following table are made by the method above. Thus, the diazotized 2-aminothiazoles are coupled with the dicarboximidoalkylaniline couplers of Formula II above as indicated by the table.

DICARBOXIMIDOALKYLANILINE COUPLER

| Example No. | 2-amino thiazole diazotized | Substituents on Radical $R_1$ | $R_2$ | $R_3$ | Y | Color polyester dyeing |
|---|---|---|---|---|---|---|
| 2 | 5-$NO_2$ | None | —$C_2H_5$ | —$CH_2CH_2$— | —$CH_2NH$— | Violet. |
| 3 | 5-$NO_2$ | None | —$C_2H_5$ | —$CH_2CH_2$— | —NHCH(C₆H₅)— | Do. |
| 4 | 5-$NO_2$ | 3-$CH_3$ | —$C_2H_5$ | —$CH_2CH_2$— | —$CH_2S$— | Do. |
| 5 | 5-$NO_2$ | 3-$CH_3$ | —$C_2H_5$ | —$CH_2CH_2$— | —N($CH_3$)—$CH_2$— | Do. |
| 6 | 5-$NO_2$ | 3-$CH_3$ | —$C_2H_5$ | —$CH_2CH_2$— | —$CH_2SO_2CH_2$— | Do. |
| 7 | 5-$NO_2$ | 3-$CH_3$ | —$C_2H_5$ | —$CH_2CH_2$— | —$NHCH_2CH_2$— | Blue. |
| 8 | 5-$NO_2$ | 3-$CH_3$ | —$C_2H_5$ | —$CH_2CH_2$— | —$CH_2OCH_2$— | Do. |
| 9 | 5-$NO_2$ | 3-$CH_3$ | —$C_2H_5$ | —$CH_2CH_2$— | —$CH_2SCH_2$— | Do. |
| 10 | 5-$NO_2$ | 3-$CH_3$ | —$C_2H_5$ | —$CH_2CH_2$— | —$CH_2NHCH_2$— | Do. |
| 11 | 5-$NO_2$ | 3-$CH_3$ | —$C_2H_5$ | —$CH_2CH_2$— | —$CH_2O$— | Do. |
| 12 | 5-$NO_2$ | 3-Cl | —$C_2H_4CN$ | —$CH_2CH(OH)CH_2$— | —CH=CH—NH— | Violet. |
| 13 | 5-$NO_2$ | 3-$OCH_3$ | —$C_2H_4CONH_2$ | —$CH_2CH_2CH_2$— | —NHNH— | Blue. |
| 14 | 5-$NO_2$ | 3-$NHCOCH_3$ | —$C_4H_9$ | —$CH_2CH(Cl)CH_2$— | —C($CH_3$)$_2$—N($CH_2OH$)— | Do. |
| 15 | 5-$NO_2$ | 3-$CH_3$-6-$OCH_3$ | H | —$CH_2CH_2$— | —NH—C₆H₄— | Violet. |
| 16 | 5-$NO_2$ | 2-$CH_3$ | H | —$CH_2CH_2$— | —O—C₆H₄— | Do. |
| 17 | 4-$CF_3$ | 2-Cl | H | —$CH_2CH_2$— | —NHCH($CH_3$)— | Red. |
| 18 | 4-$CF_3$ | 3-Cl | —$C_4H_9$ | —$CH_2CH_2CH_2$— | —$CH_2OCH_2$— | Do. |
| 19 | 4-$CH_3$ | 3-Br | —$C_4H_9$ | —$CH_2CH_2CH_2$— | —$NHCHCH_2OH$— | Do. |
| 20 | 4-$CH_3$ | 3-Br | Cyclohexyl | —$CH_2CH(CH_3)$— | —$NHCHC_4H_9$— | Do. |
| 21 | 4-$CO_2C_2H_5$ | 3-$CH_3$ | —$C_2H_4OCH_3$ | —$CH_2CH(CH_3)$— | —NHCHCOOH— | Do. |
| 22 | 4-$CO_2C_2H_5$ | 3-$CH_3$ | —$C_2H_4OCOCH_3$ | —$CH_2CH_2$— | —N(cyclopropyl)CH— | Do. |
| 23 | 4-$NHCOCH_3$ | 3-$CH_3$ | —$C_2H_4SO_2CH_3$ | —$CH_2CH_2$— | —$NHCH_2CH_2$— | Do. |
| 24 | 4-$C_6H_5$ | 3-$CH_3$ | —$CH_2CH(CH_3)CH_3$ | —$CH_2CH_2$— | —$SCH_2$— | Do. |

DICARBOXIMIDOALKYLANILINE COUPLER—Continued

| Example No. | 2-amino thiazole diazotized | Substituents on Radical $R^1$ | $R_2$ | $R_4$ | Y | Color polyester dyeing |
|---|---|---|---|---|---|---|
| 25 | 5-Br | 3-$CH_3$ | —$CH_2CHOHCH_2Cl$ | —$CH_2CH_2$— | —$NHCH_2$— | Red. |
| 26 | 5-$SO_2C_4H_9$ | 3-$CH_3$ | —$C_2H_4N\begin{smallmatrix}CO\\ \\CO\end{smallmatrix}Y$ | —$CH_2CH_2$— | —$SCH_2$— | Violet. |
| 27 | 4-$CH_3$, 5-$\overset{O}{\overset{\|}{C}}CH_3$ | 3-$CH_3$ | —$CH_2CH_2OH$ | —$CH_2CH_2$— | —$SCH_2$— | Do. |
| 28 | None | 3-$CH_3$ | —$CH_2CH_2Cl$ | —$CH_2CH_2$— | —$CH_2SCH_2$— | Red. |
| 29 | 5-CN | 3-$CH_3$ | —$C_2H_4O\overset{O}{\overset{\|}{C}}NHC_6H_5$ | —$CH_2CH_2$— | —$CH_2SCH_2$— | Violet. |
| 30 | 5-CN | 3-$CH_3$ | —$C_2H_4CO_2C_2H_5$ | —$CH_2CH_2$— | —$CH_2SCH_2$— | Do. |
| 31 | 5-$SO_2CH_3$ | 3-$CH_3$ | —$CH_2\overset{CH_3}{\overset{\|}{C}H}CN$ | —$CH_2CH_2$— | —$CH_2SCH_2$— | Do. |
| 32 | 5-$NO_2$ | 3-$CH_3$ | —$CH_2CH(OH)CH_2Cl$ | —$CH_2CH_2$— | —$CH_2OCH_2$— | Blue. |

According, for illustration, in Examples 4, 5, 8 and 32, 2-amino-5-nitrothiazole is coupled, in equimolecular amount, as described in Example 1, with the following couplers: 3-[2-(N-ethyl-m-toluidino)ethyl]-2,4-thiazolidinone, 3-[2-(N-ethyl-m-toluidino)ethyl]-1-methyl hydantoin, 4-[2-(N-ethyl-m-toluidino)ethyl]-3,5-morpholinedione, 4-[2-(N-β-hydroxy-γ-chloropropyl-m-toluidino)ethyl]-3-5-morpholinedione to obtain the azo compounds having the respective formulas shown in claims 14, 16, 15 and 12 below.

The azo compounds of the invention may be used for dyeing hydrophobic fibers such as linear polyester, cellulose ester, acrylic, polyamide, etc., fibers in the manner described in U.S. Patents 2,880,050, 2,757,064, 2,782,187 and 2,043,827. The following examples illustrate methods by which the azo compounds of the invention can be used to dye polyester textile materials.

0.1 gram of the dye is dissolved in the dye pot by warming in 5 cc. of ethylene glycol monomethyl ether. A 2% sodium-N-methyl-N-oleyl taurate and 0.5% sodium lignin sulfonate aqueous solution is added, with stirring, until a fine emulsion is obtained. Water is then slowly added to a total volume of 200 cc. 3 cc. of Dacronyx (a chlorinated benzene emulsion) are added and 10 grams of a textile fabric made of Kodel polyester fibers are entered. The fabric is worked 10 minutes without heat and then for 10 minutes at 80° C. The dyebath is then brought to the boil and held at the boil for one hour. Following this, the fabric is rinsed in warm water, then scoured in an aqueous 0.2% soap, 0.2% soda ash solution. After scouring, the fabric is rinsed with water and dried. Accordingly, since the azo compounds of the invention are water-insoluble, they can be applied from aqueous dispersions in the manner of the so-called "dispersed dyes." However, coloration can also be effected, for example, by incorporating the azo compounds into the spinning dope and spinning the fiber as usual. The azo compounds of our invention have varying utility as dyes. The degree of utility varies, for example, depending upon the material being dyed and the formula of the azo compound. Thus, for example, all the dyes will not have the same degree of utility for the same material.

By cellulose aliphatic carboxylic acid esters having 2 to 4 carbon atoms in the acid groups thereof, we mean to include, for example, both partially hydrolyzed and unhydrolyzed cellulose acetate, cellulose propionate and cellulose acetatebutyrate.

Polymeric linear polyester materials of the terephthalate type are illustrative of the linear aromatic polyester textile materials that can be dyed with the new azo compounds of our invention. The terephthalate fibers sold under the trademarks "Kodel," "Dacron" and "Terylene," for example, in the form of filaments, yarn and fabric, are illustrative of the polyester textile materials that can be dyed. Kodel polyester fibers are more particularly described in U.S. Patent 2,901,446. Dacron and Terylene polyester fibers are described, for example, in U.S. Patent 2,465,319. The polymeric linear polyester materials disclosed in U.S. patents 2,945,010, 2,957,745 and 2,989,363, for example, can be dyed. The linear aromatic polyester materials specifically named have a melting point of at least 200° C.

Nylon, in fiber, yarn and fabric form is representative of polyamides which can be dyed with the azo compounds.

The invention has been described in considerable detail with particular reference to certain preferred embodiments thereof, but it will be understood that variations and modifications can be effected within the spirit and scope of the invention as described hereinabove, and as defined in the appended claims.

What we claim is:

1. An azo compound having the formula

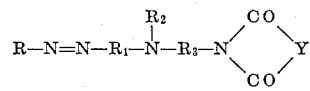

wherein

R = a monocyclic 2-thiazolyl radical,
$R_1$ = p-phenylene or p-phenylene substituted with lower alkyl, lower alkoxy, lower carboxylic acid amido, or halogen;
$R_2$ = hydrogen; lower alkyl; lower alkyl substituted with hydroxy, lower alkoxy, cyano, lower alkanoyloxy, lower caboalkoxy, halogen, lower alkylsulfonyl, carboxamido or phenylcarbamoyloxy; phenyl; phenyl substituted with lower alkyl, lower alkoxy or halogen; or cyclohexyl;
$R_3$ = lower alkylene or lower alkylene substituted with hydroxy or halogen; and
Y = —NH—NH— or a chain of 2 to 3 atoms consisting of carbon and at least one oxygen, sulfur, or nitrogen atom.

2. An azo compound having the formula

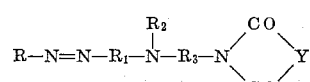

wherein $R$ = 2-thiazolyl or 2-thiazolyl substituted at the 5 position with nitro, cyano, lower alkoxycarbonyl, or lower alkylsulfonyl;

$R_1$ = p-phenylene or p-phenylene substituted with lower alkyl, lower alkoxy, lower carboxylic acid amido, or halogen;

$R_2$ = lower alkyl or lower alkyl substituted with hydroxy, halogen, cyano, alkoxy, or lower alkanoyloxy;

$R_3$ = lower alkylene; and $Y$ = —NHNH— or a chain of 2 or 3 atoms consisting of carbon and an oxygen, a sulfur, or a nitrogen atom.

3. An azo compound according to claim 2 wherein

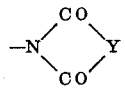

represents uracil, 5,6-dihydrouracil, hydantoin, lower alkylhydantoin, 2,5-piperazinedione, 3,5-morpholinedione, or 2,4-thiazolidinone.

4. An azo compound according to claim 2 wherein $Y$ = —NHCH$_2$—, —CH$_2$S—, —CH$_2$O—, —CH$_2$OCH$_2$—, —NHCH$_2$CH$_2$—, —CH$_2$SCH$_2$—,

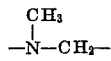

or —CH=CHNH—.

5. The compound

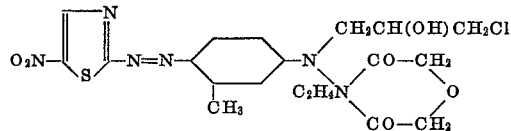

6. The compound

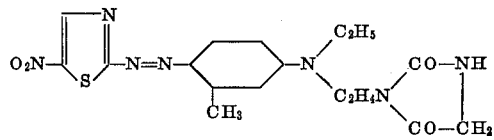

7. The compound

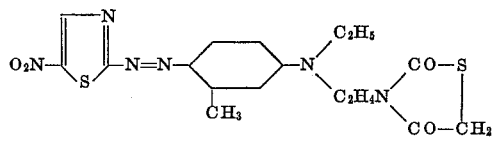

8. The compound

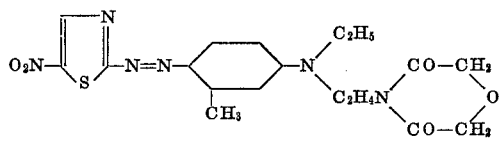

9. The compound

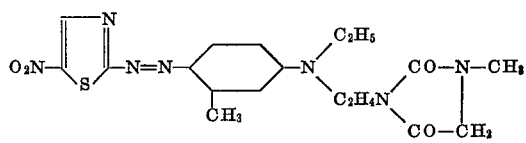

References Cited
UNITED STATES PATENTS

| | | | |
|---|---|---|---|
| 2,730,523 | 1/1956 | Dickey et al. | 260—158 |
| 2,871,231 | 1/1959 | Straley et al. | 260—146 |
| 2,944,871 | 7/1960 | Atkinson et al. | 260—158 X |
| 3,148,180 | 9/1964 | Straley et al. | 260—158 |

CHARLES B. PARKER, *Primary Examiner.*

FLOYD D. HIGEL, *Examiner.*